(12) United States Patent
Ho

(10) Patent No.: US 10,320,492 B2
(45) Date of Patent: *Jun. 11, 2019

(54) MITIGATION OF INTERFERENCE BETWEEN WIRELESS NETWORKS

(71) Applicant: TEXAS INSTRUMENTS INCORPORATED, Dallas, TX (US)

(72) Inventor: Jin-Meng Ho, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/804,958

(22) Filed: Nov. 6, 2017

(65) Prior Publication Data

US 2018/0097571 A1 Apr. 5, 2018

Related U.S. Application Data

(63) Continuation of application No. 14/828,233, filed on Aug. 17, 2015, now Pat. No. 9,813,167, which is a continuation of application No. 14/055,711, filed on Oct. 16, 2013, now Pat. No. 9,124,359, which is a continuation of application No. 12/697,092, filed on Jan. 29, 2010, now Pat. No. 8,588,154.

(60) Provisional application No. 61/148,620, filed on Jan. 30, 2009.

(51) Int. Cl.
*H04W 4/00* (2018.01)
*H04B 15/00* (2006.01)
*H04W 48/12* (2009.01)

(52) U.S. Cl.
CPC ............ *H04B 15/00* (2013.01); *H04W 48/12* (2013.01)

(58) Field of Classification Search
CPC ...................................................... H04W 48/12
USPC ........................................................ 370/329
See application file for complete search history.

(56) References Cited

U.S. PATENT DOCUMENTS

| 4,101,894 | A | 7/1978 | Warner |
| 7,174,134 | B2 | 2/2007 | Klein et al. |
| 7,496,081 | B2 | 2/2009 | Salokannel et al. |
| 8,116,295 | B2* | 2/2012 | Reumerman ......... H04W 40/24 370/348 |

(Continued)

OTHER PUBLICATIONS

Davenport, MedWin MAC and Security Proposal—Documentation, IEEE P802.15, May 4, 2009.

*Primary Examiner* — Guang W Li
(74) *Attorney, Agent, or Firm* — Andrew Viger; Charles A. Brill; Frank D. Cimino

(57) ABSTRACT

A system and method for minimizing or preventing interference between wireless networks is disclosed. A network hub broadcasts a beacon signal within repeating beacon periods. The position of the beacon signal shifts within each beacon period based upon a predetermined pseudo-random sequence. The beacon signal includes data identifying the current beacon shift sequence and the current phase of the sequence. Neighboring hubs independently or jointly determine and broadcast their own beacon shift sequences and phases for their respective networks from a predetermined list. Nodes connected with the network hubs are assigned allocation intervals having a start time that is set relative to the beacon signal. The start time and duration of the allocation interval wraps around the beacon period if the allocation-interval would otherwise start or continue in a next beacon period.

14 Claims, 4 Drawing Sheets

(56) References Cited

U.S. PATENT DOCUMENTS

| | | | | |
|---|---|---|---|---|
| 9,813,167 | B2* | 11/2017 | Ho | H04B 15/00 |
| 2004/0156427 | A1* | 8/2004 | Gilhousen | H04B 1/707 |
| | | | | 375/150 |
| 2006/0251017 | A1* | 11/2006 | Bishop | H04B 7/2693 |
| | | | | 370/330 |
| 2006/0251098 | A1* | 11/2006 | Morioka | H04W 84/18 |
| | | | | 370/432 |
| 2009/0034552 | A1* | 2/2009 | Yonge, III | H04L 12/2801 |
| | | | | 370/458 |
| 2009/0135780 | A1* | 5/2009 | Kitchin | H04W 16/14 |
| | | | | 370/329 |
| 2009/0252112 | A1* | 10/2009 | Shimomura | H04L 5/0007 |
| | | | | 370/330 |
| 2010/0142396 | A1* | 6/2010 | Kim | H04W 16/14 |
| | | | | 370/252 |
| 2013/0114643 | A1* | 5/2013 | Shope | H04B 1/707 |
| | | | | 375/142 |

\* cited by examiner

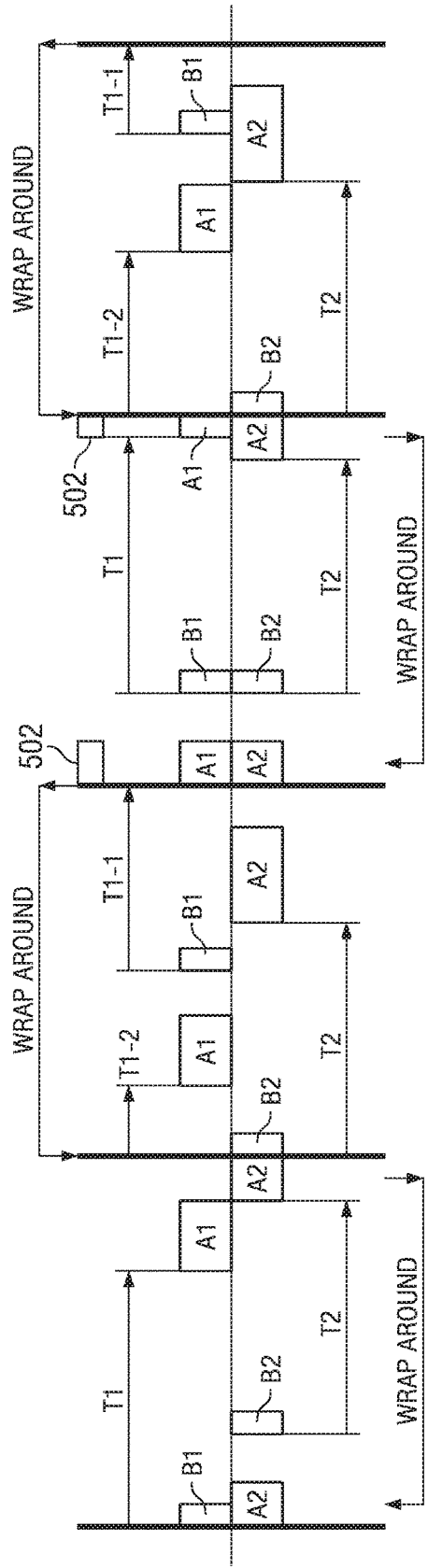
FIG. 5
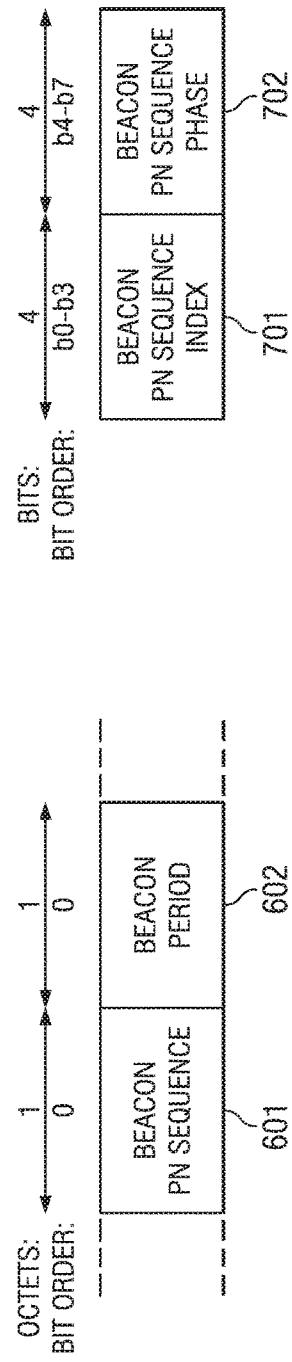
FIG. 6
FIG. 7

MITIGATION OF INTERFERENCE BETWEEN WIRELESS NETWORKS

CROSS-REFERENCE TO RELATED APPLICATIONS

The present application is a continuation of U.S. patent application Ser. No. 14/828,233, filed Aug. 17, 2015 (U.S. Pat. No. 9,813,167), which is a continuation of U.S. patent application Ser. No. 14/055,711, filed Oct. 16, 2013 (U.S. Pat. No. 9,124,359), which is a continuation of U.S. patent application Ser. No. 12/697,092, filed Jan. 29, 2010 (U.S. Pat. No. 8,588,154), which claims the benefit of the filing date of U.S. Provisional Patent Application No. 61/148,620, which is titled "Mitigation of Interference between Wireless Networks" and filed Jan. 30, 2009, are incorporated by reference in their entirety.

TECHNICAL FIELD

Embodiments of the invention are directed, in general, to coexistence between wireless networks and, more specifically, to mitigating inter-network interference by changing the transmission time of a beacon reference signal.

BACKGROUND

Mutual interference between wireless devices is a well-known problem. At a basic level, when two devices attempt to exchange information, the devices typically coordinate their transmit times so that they are not transmitting to each other simultaneously. When more devices are added to form a network, each additional device must also coordinate its transmit time so that two or more devices do not simultaneously transmit to a network hub. Networks may designate specific transmit times for each device. However, this solution becomes more complicated as new devices are added to a network and the available transmit times are used up.

The interference-avoidance problem becomes more complicated when multiple networks operate in the same area. Two or more neighboring networks may experience transmission collisions not only between nodes in the same network, but also between nodes in the separate networks. Frequency separation may be used to avoid transmission collisions between these separate networks. However, this solution will not work when the multiple devices must transmit on a common channel, such as when two networks happen to operate on the same channel for intended or unintended reasons.

For ad hoc networks that can be formed in any location, spatial separation cannot be used to avoid transmission collisions on the same channel. Accordingly, there is a need for a procedure to avoid mutual interference among networks that transmit on the same or adjacent frequency bands.

BRIEF SUMMARY OF THE DISCLOSURE

Groups of wireless devices or nodes are organized into networks, each having a network hub. Node access to a common channel is coordinated by the hub, but access is not coordinated between networks, which can result in inter-network interference. A beacon is transmitted by the hub in each beacon period. Each beacon contains timing, access, and capability information. The beacon transmission time, relative to the start of a beacon period, shifts from one beacon period to next according to a pseudo-random sequence. Different pseudo-random sequences are used by neighboring network hubs. Repeated collisions between inter-network beacons and other transmissions are circumvented when neighboring network hubs use different beacon shift sequences. The current shift sequence index and the phase of the shift sequence are encoded in the beacon frame, which allows each node in the network to readily determine the next beacon time.

The hub transmits a beacon frame including a beacon shift sequence index and beacon shift sequence phase. The beacon shift sequence index identifies the pseudo-random shift sequence governing the beacon transmission pattern currently in use. In one embodiment, nine predetermined beacon shift sequences are defined and related to specific indices, including a sequence providing no beacon offset in each beacon period. The beacon shift sequence phase is set to the current phase or position of the chosen beacon shift sequence in the current beacon period.

Embodiments of the invention minimize or prevent inter-network interference by rotating the beacon transmission times from one beacon period to next. As a result of shifting beacon transmission times, the allocated intervals for each node in the network are shifted from one beacon period to next as well. Beacon transmission times are encoded in a beacon frame by the transmitting hub, which allows nodes in the hub's network to identify their respective allocation intervals. Hubs may independently or jointly choose their own beacon shifting patters without exchanging time sharing messages between them.

BRIEF DESCRIPTION OF THE DRAWINGS

Figure 1:
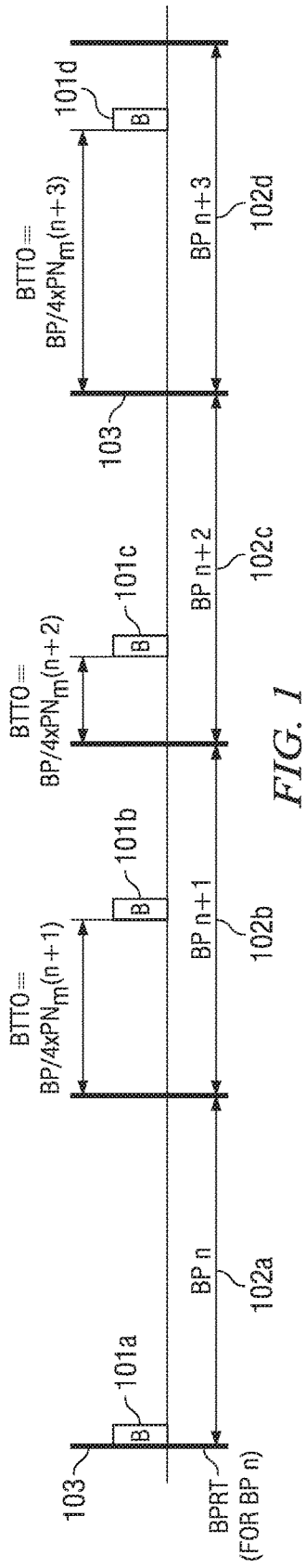
Figure 2:
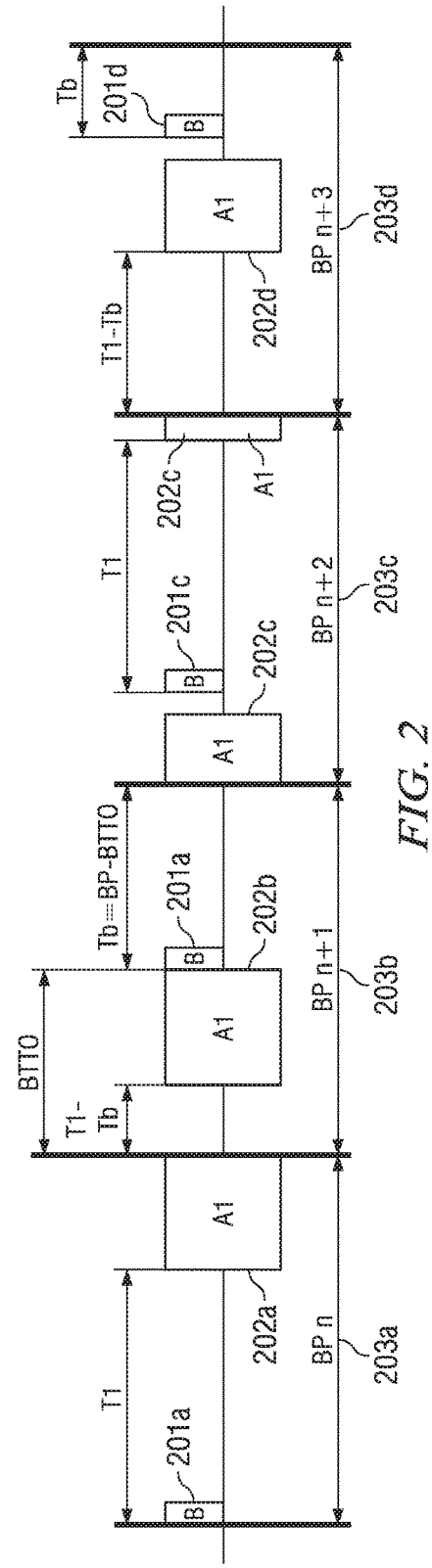
Figure 3:
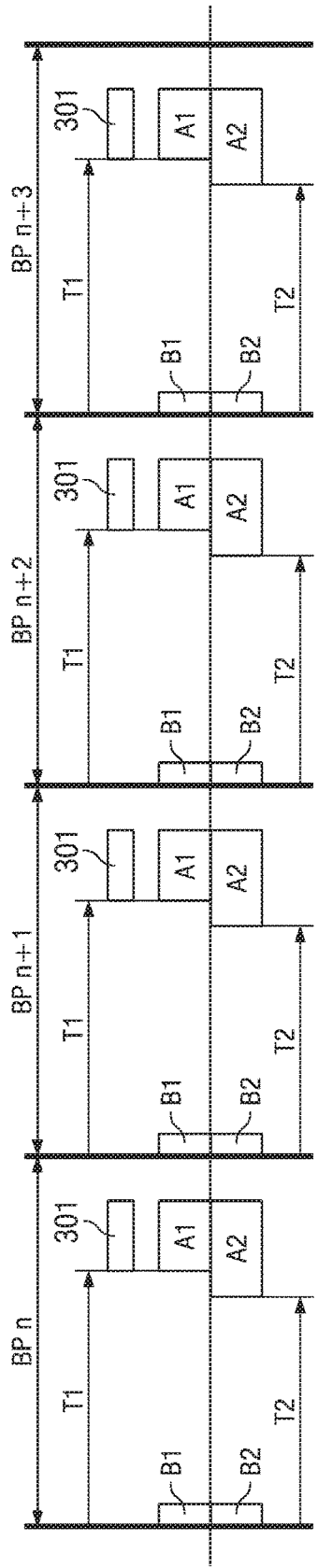
Figure 4:
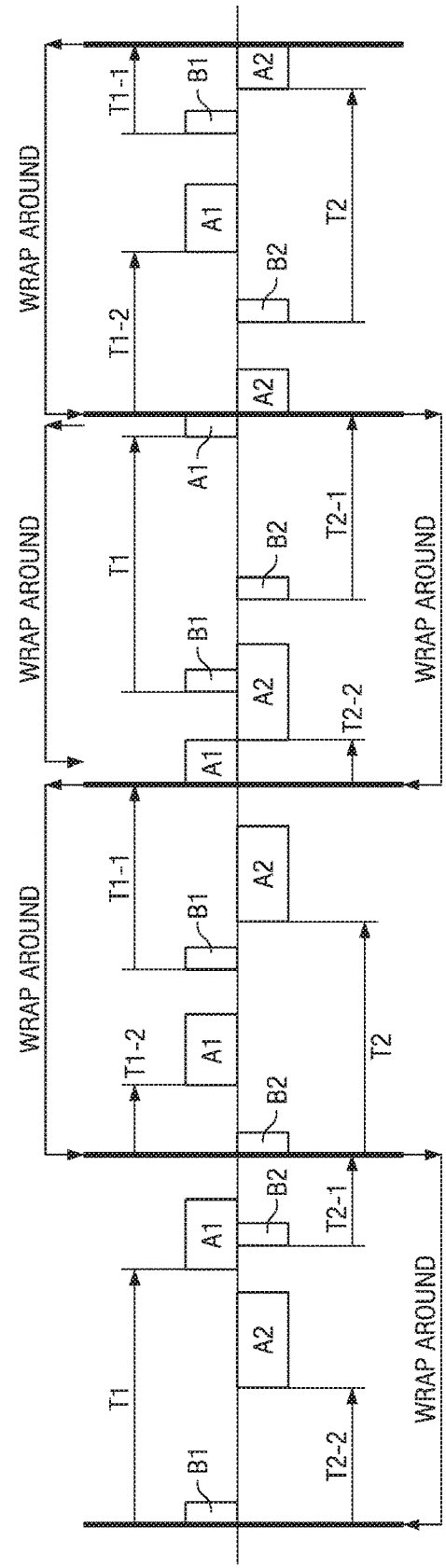
Figure 8:
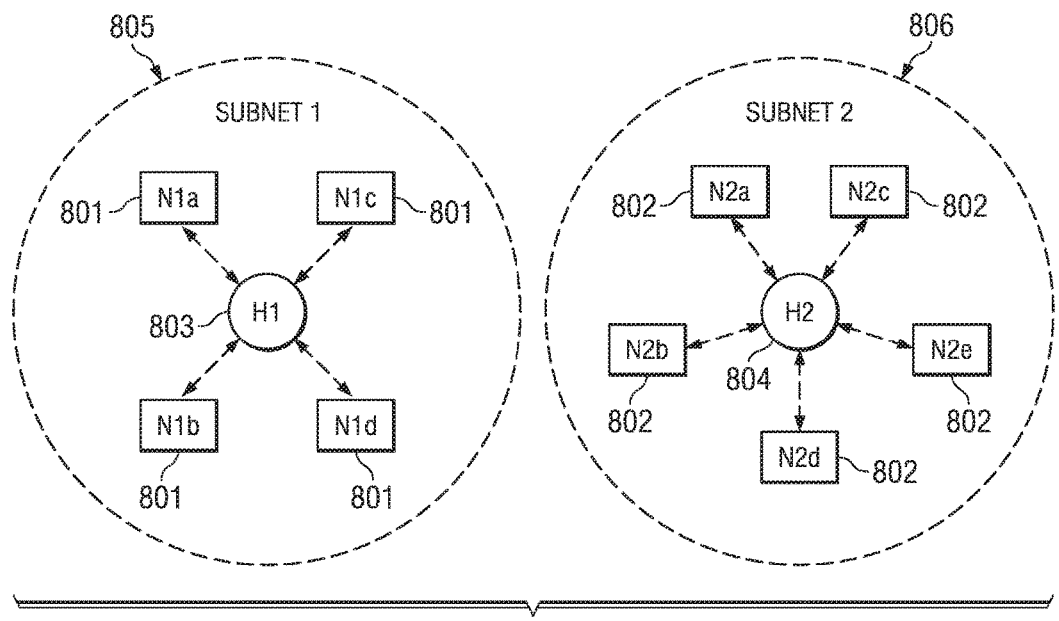
Figure 9:
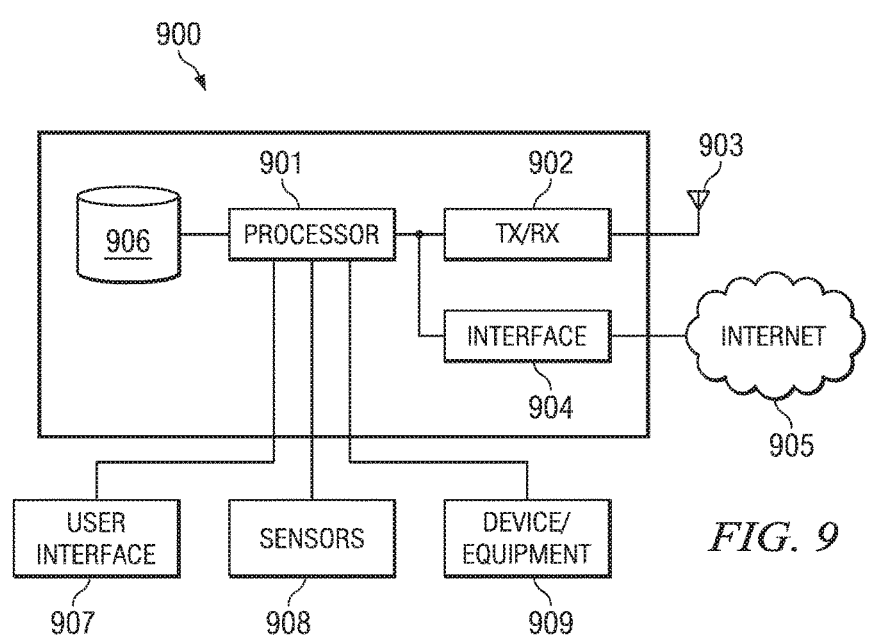

Having thus described the invention in general terms, reference will now be made to the accompanying drawings, wherein:

FIG. 1 illustrates the use of offset beacon frames within a plurality of beacon periods according to an exemplary embodiment of the invention;

FIG. 2 illustrates a time relationship between an allocation interval and a beacon over a series of beacon periods;

FIG. 3 illustrates a time relationship between adjacent networks using the same shift sequence;

FIG. 4 illustrates a time relationship between adjacent networks using the same shift sequence that are offset in phase;

FIG. 5 illustrates a time relationship between adjacent networks using different shift sequences that are offset in phase;

FIG. 6 illustrates one embodiment of beacon shifting information transmitted in the beacon by a hub;

FIG. 7 illustrates a beacon shift sequence comprising a beacon shift sequence index and beacon shift sequence phase;

FIG. 8 is a block diagram illustrating a network topology employing embodiments of the invention; and FIG. 9 is a block diagram of an exemplary embodiment of a device for providing interference mitigated communications with another device.

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

In one embodiment, a group of wireless devices form an ad hoc network with one of the devices acting as a network hub. Among other functions, the hub is responsible for coordinating the transmission time of each of the nodes in the network and for resolving transmission time conflicts to prevent or minimize intra-network interference.

The hub transmits a beacon frame B that is used as a reference point by the nodes within the hub's network to determine each respective node's transmission time. The beacon frames B are transmitted once within repeating beacon periods BP. The duration of the beacon period is selected by the hub. The beacon B may be transmitted at the beginning of each beacon period or at some time offset from the start of the beacon period.

FIG. 1 illustrates the use of offset beacon frames 101a-d within a plurality of beacon periods 102a-d according to an exemplary embodiment of the invention. The hub selects the duration of the beacon period and preferably does not change its beacon period while one or more nodes are connected with it. The start of each beacon period 102a-d is designated as the beacon period reoccurring time (BPRT) 103. The beacon frames 101a-d occur at a designated time that is offset from the BPRT. The offset is referred to herein as the beacon transmission time offset (BTTO). The BTTO may be any value from zero (i.e. no offset) to the end of the beacon period, but is preferably set to a multiple of one-quarter of the beacon period (i.e. BP/4). For example, beacon 101a is not offset within the beacon period (BP/4×0), beacon 101b is offset by half of the beacon period (BP/4×2), beacon 101c is offset by one-quarter of the beacon period (BP/4×1), and beacon 101d is offset by three-quarters of the beacon period (BP/4×3).

The offset value can be represented by the following equation:

$$BTTO = PN_m(n) \times BP/4, \quad (1)$$

Here, $PN_m$ is a pseudo-random beacon shifting sequence, m is a beacon shifting sequence index selected by the hub for its beacon transmission time pattern, BP is the length of the beacon period, and n is the phase of the chosen sequence (n=0, 1, ...).

The values of the beacon shifting sequence for the index m=0 are all set to 0 (i.e., $PN_0(n)=0$, n=0, 1, ...). With this sequence, the beacon transmission time always occurs at the start of each beacon period. For other index m values, the beacon shifting sequence $PN_m(n)$ adjusts the beacon transmission time among two or more values selected from the values: 0, 1, 2, and 3. Examples of beacon shifting sequences $PN_m(n)$ for different values of index m are shown below in Table 1. The hub should choose a beacon shifting sequence $PN_m(n)$ that is not being used by neighboring hubs in order to mitigate potential repeated beacon collisions. The use of different beacon shifting sequences $PN_m(n)$ between overlapping or adjacent networks will also reduce conflicts between nodes by the nodes' transmissions at scheduled or allocated times. Beacon shift sequence index m=5 from Table 1 is illustrated in the example of FIG. 1.

TABLE 1

| BEACON SHIFTING SEQUENCE INDEX (m) | BEACON SHIFTING SEQUENCE PATTERN (PNm(n)) ("..." INDICATES PATTERN REPEAT) |
|---|---|
| 0 | $PN_0(n) = 0, 0, 0, 0, \ldots$ |
| 1 | $PN_1(n) = 0, 1, 0, 1, \ldots$ |

TABLE 1-continued

| BEACON SHIFTING SEQUENCE INDEX (m) | BEACON SHIFTING SEQUENCE PATTERN (PNm(n)) ("..." INDICATES PATTERN REPEAT) |
|---|---|
| 2 | $PN_2(n) = 0, 2, 0, 2, \ldots$ |
| 3 | $PN_3(n) = 0, 1, 2, 3, \ldots$ |
| 4 | $PN_4(n) = 0, 1, 3, 2, \ldots$ |
| 5 | $PN_5(n) = 0, 2, 1, 3, \ldots$ |
| 6 | $PN_6(n) = 0, 2, 3, 1, \ldots$ |
| 7 | $PN_7(n) = 0, 3, 1, 2, \ldots$ |
| 8 | $PN_8(n) = 0, 3, 2, 1, \ldots$ |
| 9-15 | Reserved |

A beacon frame is transmitted by the hub in each beacon period. Each beacon frame contains timing, access, and capability information. For example, the sequence index m and the phase n of the PN sequence being used by the hub are encoded in the beacon frame, which allows each device in the network to readily determine the next beacon time. The beacon transmission time, relative to the beacon period recurring time (BPRT), changes from one beacon period to next according to the selected PN sequence. Repeated inter-network beacon and other transmission collisions are circumvented by neighboring hubs using different PN sequences or the same PN sequence offset in phase.

In one embodiment, the hub assigns an allocation interval A1 to each node. The allocations are time intervals that a node or a hub uses to initiate frame transactions. FIG. 2 illustrates the relationship between allocation A1 202a-d and beacon B 201a-d over a series of beacon periods BP 203a-d. The start time of the allocation within each beacon period begins at time T1, which is defined relative to the start of the beacon transmission time. Because the transmission of the beacon may occur after the start of the beacon period, the delay T1 may result in the allocation interval extending beyond the end of the current beacon period. To compensate for the situation where the allocation would begin or continue after the beacon period, the allocation interval "wraps around" the beacon period to the BPRT.

In FIG. 2, allocation start time T1 is the beginning of the allocation in the beacon period relative to the beacon transmission time. In beacon period 203a, allocation 202a begins time T1 after beacon 201a, which allows allocation 202a to fit within the beacon period. In beacon periods 203b and 203d, the start times for allocations 202b and 202d are determined by wrapping the allocation start time T1 within the beacon period so that the start of the allocation occurs before the beacon transmission. Allocations 202b and 202d begin at the time: T1-Tb after the start of the beacon period, wherein time Tb is the time remaining in the beacon period after the beacon transmission time offset (Tb=BP-BTTO).

In beacon period 203c, allocation 202c begins after the transmission of beacon 201c; however, there is not enough time remaining in the beacon period to complete the allocation interval 202c. Therefore, allocation 202c is wrapped around the beacon period, which results in a fragmented allocation interval. In the example illustrated in FIGS. 1 and 2, potential beacon offsets from the beacon period repetition time occur at one-quarter intervals within the beacon period (i.e. 0, ¼BP, ½BP, and ¾BP). An allocation would not be fragmented if A1<BP/4. However, even if A1>BP/4, little efficiency will be lost due to fragmentation with appropriate allocation position and duration.

FIGS. 3-5 illustrate the time relationships between adjacent networks using various beacon shifting sequences. In a first network, a first hub transmits a beacon frame B1, and a node associated with the first hub is assigned allocation A1 at time T1. In a second network, a second hub transmits a beacon frame B2, and a node associated with the second hub is assigned allocation A2 at time T2.

In FIG. 3, the networks use the same PN sequence. The first hub and second hub both use the same beacon shifting sequence index (e.g. m=0), in which both beacon frames B1 and B2 occur at the same time (e.g. zero offset from the BPRT in each beacon period). Due to the assigned interval start times T1, T2, node allocations A1 and A2 overlap, thereby causing collisions 301 and mutual interference in every beacon period.

In FIG. 4, the networks use the same PN sequence, but are offset in phase. The first hub and the second hub both use beacon shifting sequence index m=5, so that beacon frames B1 and B2 follow the same beacon shift sequence (0, 2, 1, 3, . . . ). However, in FIG. 4, the first hub and second hub are offset in phase. For example, when the first hub is transmitting beacon B1 for phase n, the second hub is transmitting beacon B2 for phase n−1. As a result, node allocations A1 and A2 in the respective networks never overlap and do not create collisions.

In FIG. 5, the networks use different PN sequences and are offset in phase. The first hub uses beacon shifting sequence index m=5, so that beacon frames B1 follow beacon shift sequence (0, 2, 1, 3, . . . ). The second hub uses beacon shifting sequence index m=1, so that beacon frames B1 follow beacon shift sequence (0, 1, 0, 1, . . . ). In addition to using different beacon shift sequences, the first hub and second hub are also offset in phase. For example, when the first hub is transmitting beacon B1 for phase n, the second hub is transmitting beacon B2 for phase n+1. In most of the beacon periods, the shifting beacon frames and allocations result in no overlap. However, occasionally, such as in beacon period 501, the respective beacon frames B1, B2, occur at the same time and allocation intervals A1, A2 also partially overlap resulting in collision 502 and mutual interference. Although the mutual interference occurs in one out of four beacon periods (25%), the nodes are still able to communicate with their respective hubs in the other three out of four beacon periods (75%), and hence mutual interference is mitigated.

FIG. 6 illustrates one embodiment of beacon shifting information transmitted in the beacon period by a hub. Beacon PN sequence 601 comprises the beacon PN sequence index 701 and beacon PN sequence phase 702 information as illustrated in FIG. 7. Beacon PN sequence index 701 is set to the index of the PN sequence governing the beacon transmission pattern currently in use by the hub. Nine examples of PN sequences are defined above in Table 1, including PN sequence 0 which provides for no beacon offset within all beacon periods. Beacon PN sequence phase 702 is set to the phase (i.e., position) of the chosen PN sequence in the current beacon period. The value of beacon PN sequence phase 702 cycles between 0 and 3 in the current example. Beacon period 602 contains the length of the beacon periods effective in the network.

Although the embodiment described herein sets forth nine examples of beacon shift sequences based on four phase positions, it will be understood that other beacon shift sequences may also be used and that the beacon periods may be divided into different numbers of phase positions. In other embodiments, for example, the hub may select the number of available phase positions based upon the length of the beacon period, the number of nodes that can be connected with the hub, and the number of neighboring hubs detected.

FIG. 8 is a block diagram illustrating a network topology employing embodiments of the invention. Nodes 801, 802 and hubs 803, 804 are organized into logical sets, referred to as networks. In the illustrated embodiment, there is only one hub in a network, but the number of nodes in a network may vary. For example, network 1 805 comprises hub 803 and plurality of nodes 801, and network 2 806 comprises hub 804 and plurality of nodes 802. In one embodiment, messages are exchanged directly between the nodes and their respective hub—i.e. within the same network only. In another embodiment of the invention, messages may be exchanged between different networks. The hub and nodes may communicate using a wireless or wireline connection. Each hub transmits a beacon frame to its respective nodes. The beacon frame may include the data illustrated above in FIGS. 6 and 7, for example, including the beacon shift sequence index, beacon shift sequence phase, and beacon period length currently in use by the hub. Preferably, hub 804 selects a different beacon shift sequence index and/or a different beacon shift sequence phase than the index/phase currently in use by hub 803. The term network is used herein, but will be understood to be interchangeable with terms such as subnet or cluster. The term hub as used herein will be understood to be interchangeable with other network control devices, such as a cluster controller.

FIG. 9 is a block diagram of an exemplary embodiment of a device 900 for providing interference mitigated communications with another device. Device 900 may be used as a node 901, 902 and/or a hub 903, 904 in FIG. 9. Processor 901 processes messages to be exchanged with other nodes via transceiver 902 and antenna 903 and/or via wireline interface 904 coupled to Internet or another network 905. Processor 901 may be a software, firmware, or hardware based device. Processor 901 may compute or select a beacon shift sequence index, beacon shift sequence phase, beacon period length, and beacon frame. Processor 901 may also monitor beacon frames transmitted by other hubs to evaluate beacon shift sequences in use by other networks. Processor 901 may receive and process beacons containing a beacon shift sequence index, beacon shift sequence phase, and beacon period length. Process 901 may shift allocation intervals with shifting beacon transmission times.

Memory 906 may be used to store beacon data, such as beacon shift sequence patterns, a current beacon shift sequence index, beacon shift sequence phase, and beacon period length. Memory 906 may be secured from unauthorized access. Memory 906 may also be used to store computer program instructions, software and firmware used by processor 901. It will be understood that memory 906 may be any applicable storage device, such as a fixed or removable RAM, ROM, flash memory, or disc drive that is separate from or integral to processor 901.

Device 900 may be coupled to other devices, such as user interface 907, sensors 908, or other devices or equipment 909. In one embodiment, device 900 is a hub, gateway, or controller controlling and communicating with one or more nodes. In another embodiment, device 900 is a low-power wireless node operating on, in, or around a human or non-human body to serve one or more applications, such as medical connections, consumer electronics, and personal entertainment. Device 900 may be adapted to operate in a body area network either as a node or as a hub controlling a plurality of nodes. Sensors 908 may be used, for example, to monitor vital patient data, such as body temperature, heart rate, and respiration. Equipment 909 may be, for example, a monitor or other device that receives and analyzes signals, such as a patient's temperature, heart rate, and respiration, from another node. Alternatively, equipment 909 may be a device for providing a service to a patient, such as controlling an intravenous drip, respirator, or pacemaker.

When used as a node or hub in a body area network, the information transmitted or received by device 900 is likely to include sensitive or critical medical information or instructions. Accordingly, it is important to ensure that data transmitted by the nodes or hub is not disrupted or blocked by interference from other nodes within the same or other networks. The messages transmitted or received by device 900 may also include control signals, such as signals to control distribution of medicine or operation of a respirator or pacemaker. It is important that these signals are properly transmitted and received to control equipment 909.

It will be understood that the networks 805, 806 in FIG. 8 and device 900 in FIG. 9 are presented for illustrative purposes only and are not intended to limit the scope of the systems or devices that are capable of employing the beacon shift sequence and mutual-interference mitigation procedures described herein. Any two devices in wireless or wireline communication with each other and each having the capability to adjust a beacon frame timings would be capable of using these procedures Many modifications and other embodiments of the invention will come to mind to one skilled in the art to which this invention pertains having the benefit of the teachings presented in the foregoing descriptions, and the associated drawings. Therefore, it is to be understood that the invention is not to be limited to the specific embodiments disclosed. Although specific terms are employed herein, they are used in a generic and descriptive sense only and not for purposes of limitation.

The invention claimed is:

1. A method of communication between a network hub and at least one network node based on transmitting from the network hub a beacon signal, the method used in a system that includes multiple adjacent network hubs, the method comprising:
    at each network hub, transmitting a beacon frame, corresponding to the beacon signal, during a beacon period, the beacon period beginning at a beacon period reoccurring time;
    the beacon frame identifying a beacon shifting sequence index and a beacon shifting sequence phase, the beacon shifting sequence index:
    identifying a specific beacon shifting sequence corresponding to a repeating PN (pseudo-random) beacon shifting sequence pattern as a series of beacon shifting sequence phases, each beacon shifting sequence phase, indicating a position within the beacon shifting sequence pattern, and corresponding to a beacon transmission time offset within the beacon period;
    using a current beacon shifting sequence designated by a current beacon shifting sequence index; and
    transmitting the beacon frame in a specific beacon period according to the current beacon shifting sequence based on:
    determining a current beacon shifting sequence phase for the beacon frame,
    determining a current beacon transmission time offset corresponding to the current beacon shifting sequence and the current beacon shifting sequence phase, and
    transmitting the beacon frame at a beacon frame transmission time delayed after the beacon period recurring time by the current beacon transmission time;
    at least one network hub, transmitting the beacon frame with a beacon shifting sequence phase that is offset from a beacon shifting phase transmitted by at least one other network hub.

2. The method of claim 1, further comprising:
    storing in a memory the repeating PN sequences, each associated with the corresponding the beacon shifting sequence index.

3. The method of claim 1, further comprising:
    for the specific beacon period in which the beacon frame is transmitted, determining an allocation interval and an allocation-interval start time for communicating a transaction frame, and
    wherein the allocation-interval start time is a defined interval after the beacon frame transmission time.

4. The method of claim 3,
    wherein the allocation-interval start time wraps around a current beacon period when the allocation interval extends past the current beacon period.

5. The method of claim 4, wherein the allocation interval occurs before the beacon frame transmission time.

6. The method of claim 4, wherein a portion of the allocation interval occurs at a beginning of the current beacon period.

7. The method of claim 1, further comprising
    at the at least one network hub, transmitting the beacon frame with a beacon shifting sequence index that identifies a beacon shifting sequence that is the same as transmitted by the at least one other network hub.

8. A network hub for communication with at least one network node based on transmitting beacon signal, the network hub used in a system with multiple adjacent network hubs, the network hub comprising:
    the beacon signal corresponding to a beacon frame to be transmitted by the network hub during a beacon period, the beacon period beginning at a beacon period reoccurring time;
    the beacon frame identifying a beacon shifting sequence index and a beacon shifting sequence phase;
    the beacon shifting sequence index:
        identifying a specific beacon shifting sequence corresponding to a repeating PN (pseudo-random) beacon shifting sequence pattern as a series of beacon shifting sequence phases, each beacon shifting sequence phase:
            indicating a position within the beacon shifting sequence pattern, and
            corresponding to a transmission time offset within the beacon period;
    circuitry to select a current beacon shifting sequence designated by a current beacon shifting sequence index; and
    transmission circuitry to transmit the beacon frame in a specific beacon period according to the current beacon shifting sequence based on:
        a current beacon shifting sequence phase for the beacon frame,
        a current beacon transmission time offset corresponding to the current beacon shifting sequence and the current beacon shifting sequence phase, and
    the transmission circuitry to transmit the beacon frame at a beacon frame transmission time delayed after the beacon period recurring time by the current beacon transmission time offset;
    transmitting the beacon frame with a beacon shifting sequence phase that is offset from a beacon shifting phase transmitted by at least one other network hub.

9. The network hub of claim 8, further comprising:
transmitting the beacon frame with a beacon shifting sequence index that identifies a beacon shifting sequence that is the same as transmitted by at least one other hub.

10. A network node for communicating with a network hub based on receiving a beacon signal, in a system with multiple adjacent network hubs, the network node comprising:
the beacon signal corresponding to a beacon frame received by the network node during a beacon period, the beacon period beginning at a beacon period reoccurring time;
the beacon frame identifying a beacon shifting sequence index and a beacon shifting sequence phase;
the beacon shifting sequence index:
identifying a specific beacon shifting sequence corresponding to a repeating PN pseudo-random beacon shifting sequence pattern as a series of beacon shifting sequence phases, each beacon shifting sequence phase
indicating a position within the beacon shifting sequence pattern, and
corresponding to a transmission time offset within the beacon period;
receive circuitry to receive the beacon frame in a specific beacon period according to a current beacon shifting sequence designated by a current beacon shifting sequence index based on:
a current beacon shifting sequence phase for the beacon frame,
a current beacon transmission time offset corresponding to the current beacon shifting sequence and the current beacon shifting sequence phase, and
the receive circuitry to receive the beacon frame at a beacon frame transmission time delayed after the beacon period recurring time by the current beacon transmission time offset,
the beacon frame received from the associated network hub having a beacon shifting sequence phase that is offset from a beacon shifting phase transmitted by at least one other network hub.

11. The network node of claim 10, further comprising:
for the specific beacon period in which the beacon frame is transmitted, determining an allocation interval and an allocation-interval start time for communicating a transaction frame, and
wherein the allocation-interval start time is a defined interval after the beacon frame transmission time.

12. The network node of claim 11,
wherein the allocation-interval start time wraps around a current beacon period when the allocation interval extends past the current beacon period.

13. The network node of claim 11, wherein a portion of the allocation interval occurs at a beginning of the current beacon period.

14. The network node of claim 10, wherein
the beacon frame received from the associated network hub having a beacon shifting sequence index that identifies a beacon shifting sequence that is the same as transmitted by the at least one other hub.

* * * * *